United States Patent [19]

Helbling

[11] Patent Number: 5,080,008
[45] Date of Patent: Jan. 14, 1992

[54] COFFEE MACHINE WITH PRODUCT SELECTIVITY

[76] Inventor: Edward Helbling, 47 Annandale Rd., Commack, N.Y.

[21] Appl. No.: 512,764

[22] Filed: Apr. 23, 1990

Related U.S. Application Data

[63] Continuation-in-part of Ser. No. 389,424, Aug. 3, 1989, Pat. No. 4,967,648, which is a continuation-in-part of Ser. No. 218,107, Jul. 12, 1988, Pat. No. 4,858,523.

[51] Int. Cl.⁵ .............................................. A47J 31/00
[52] U.S. Cl. ........................................ 99/280; 99/285; 99/306
[58] Field of Search ............. 99/279, 295, 300, 302 R, 99/306, 316, 293, 280, 281, 282, 285, 286; 426/433

[56] References Cited

U.S. PATENT DOCUMENTS

| | | | |
|---|---|---|---|
| 4,550,652 | 11/1985 | Da Silva | 99/279 |
| 4,579,048 | 4/1986 | Stover | 99/295 |
| 4,790,239 | 12/1988 | Hewitt | 99/279 |

Primary Examiner—Robert W. Jenkins
Attorney, Agent, or Firm—Herbert Dubno

[57] ABSTRACT

A plurality of carafes on a coffee machine primarily for restaurant and institution use can be filled selectively with decaffeinated or normal coffee via a distributor between a brewing chamber and the outlets to the carafes. The microprocessor controller operates the device selecting the coffee or delivery to the brewing chamber in response to signals received from the carafes if they are placed at respective stations on the machine so that a decaffeinated carafe at any station will receive only decaf and a normal carafe will receive only normal coffee regardless of the station at which it is placed.

12 Claims, 3 Drawing Sheets

COFFEE MACHINE WITH PRODUCT SELECTIVITY

CROSS REFERENCE TO RELATED APPLICATIONS

This is a continuation-in-part of copending application Ser. No. 07/389,424 filed: Aug. 3, 1989 (now U.S. Pat. No. 4,967,648 of Nov. 6, 1990).

This application is a continuation-in-part of my application Ser. No. 07/389,424 filed Aug. 3, 1989 (now U.S. Pat. No. 4,967,648 of Nov. 6, 1990) as a continuation-in-part of application Ser. No. 07/218,107 filed July 12, 1988 (now U.S. Pat. No. 4,858,523 of Aug. 22, 1989).

FIELD OF THE INVENTION

My present invention relates to a coffee machine with improved product selectivity and, more particularly, to a coffee machine having improved capabilities when employed in restaurant and institutional facilities.

Specifically the invention relates to a coffee machine adapted to dispense a plurality of beverages, especially decaffeinated and normal coffee, hot water for tea and the like from a plurality of carafes. The invention also relates to a coffee machine of this type capable of automatically dispensing cup quantities of such beverages.

BACKGROUND OF THE INVENTION

The advent of machines capable of producing pots of coffee utilizing a filter containing a quantity of ground coffee beans to which hot water can be fed, has revolutionized the art of coffee preparation and machines for this purpose have become wide-spread in the home and in restaurants and other institutions. In a home coffee machine of this type, a measured quantity of water is introcompartment which may contain a replaceable, disposable filter and a measured quantity of coffee grounds. The coffee grounds, in accordance with the requirements of the user, generally are manually added to the filter from a can of regular coffee nondecaffeinated coffee or from a can of decaffeinated coffee.

Below the brewing compartment, generally on a heating plate, a carafe can be positioned to receive the brewed coffee. In some cases, the brewing compartment is mounted on the mouth of the carafe.

While such systems have been found to be suitable for the home or wherever relatively small amounts of the beverage are to be dispensed, these machines have not found widespread acceptability in restaurants and other institutional facilities which require machines capable of serving a larger number of patrons.

Accordingly, it is not uncommon for such a facility to have a coffee making machine in which a plurality of carafes are provided on respective hot plates or heaters and one or more carafes may be filled with hot water for tea, decaffeinated coffee and normal coffee, in readiness for service to the patrons, while a single coffee making station is provided on the machine below a brewing compartment of the type described having a replaceable filter which can be introduced into the machine and removed from the machine, for example, on a filter carrier. The latter can be filled with a measured amount of coffee grounds, once a filter has been inserted therein, e.g. in a separate station.

Such coffee makers have the drawback that they rely heavily upon manual invention which is involved in all phases other than the brewing process, but can be connected directed to a water supply line so that they need not be filled manually with measured quantities of water. Manual invention is required to introduce the coffee grounds which are to be employed. In addition, the versatility of such machines leaves much to be desired.

In a significant improvement of this type of apparatus, I have described in my U.S. Pat. No. 4,858,523, of which application Ser. No. 07/389,424 (now U.S. Pat. No. 4,967,648) is a continuation-in-part, an automatic infusion beverage apparatus which greatly facilitates the automation of the coffee making process and can use prepackaged quantities of coffee grounds and respective filter units to which a distributor can selectively feed the hot water to produce the beverage.

The beverage is dispensed from a tank, for example.

In the improvement described in my copending application Ser. No. 07/389,424, (U.S. Pat. No. 4,967,648) these principles are extended to a system in which carafes can be individually filled with selected beverages brewed from a plurality of compartments.

Attention should also be directed to the rather complex coffee making machine described in U.S. Pat. No. 4,858,523 which has a source of coffee grounds, namely, a grinder associated therewith and thus does not require preparation of the grounds separately or manual measurement of the grounds which are to be used in making a quantity of the coffee.

In a still earlier U.S. Pat. No. 3,872,781, I have described an automatic coffee brewer which utilizes a plurality of brewing compartments.

Finally, reference should be made to U.S. Pat. No. 4,732,079, 4,583,449, 4,389,924, 4,200,039, 4,758,709, 4,725,714, 4,655,123 and 4,262,585 which detail a variety of systems for brewing the coffee, heating the water for such brewing and controlling the process.

By and large, while the art cited above discloses that it is known to provide a source of coffee grounds within the apparatus, e.g. a supply of coffee beans and a grinder, these earlier machines are relatively complex and do not fully satisfy the need for large volume coffee preparation and the specific needs of restaurants, short order facilities and other institutions supplying coffee to large numbers of consumers.

OBJECTS OF THE INVENTION

The principal object of my present invention is to extend the principles of my above mentioned copending application Ser. No. 07/389,424 (U.S. Pat. No. 4,967,648) and my prior application Ser. No. 07/218,107 filed July 12, 1988. (U.S. pat. No. 4,858,523).

A more general object is to provide an improved coffee making machine which avoids drawbacks of prior art coffee makers and has high versatility and adaptability, especially for use in restaurants, short order facilities and institutional applications.

Another object of this invention is to provide a highly automatic coffee making machine which can eliminate problems with confusion between various types of brewed beverages, especially decaffeinated coffee and normal or nondecaffeinated coffee.

It is also an object of the invention to provide an apparatus of the type described which has improved facilities for the service of patrons in small quantities, i.e. will permit the dispensing of cup quantities of coffee as need arises.

SUMMARY OF THE INVENTION

These objects and others which will become apparent hereinafter are attained, in accordance with the present invention, in an apparatus for brewing coffee which comprises a brewing compartment, means for selectively feeding that brewing compartment with a plurality of infusion substances from which respective beverages can be brewed, e.g. normal coffee grounds or decaffeinated coffee grounds, means for feeding hot water to the brewing compartment to the brewing compartment, and distributing means between the brewing compartment and a plurality of carafe stations for selectively delivering the particular brewed beverage to a respective outlet for a carafe assigned to that particular beverage.

It will be understood that it is common in restaurants and like facilities to make available distinct carafes for normal coffee and decaffeinated coffee.

With the system of the present invention, a microprocessor controller is provided to insure that, when decaffeinated coffee is brewed, for example, the distributor will feed the brewed decaffeinated coffee only to the carafe which has been specifically assigned to receive it and is color coded or otherwise demarcated so that the waiter, waitress or other individual dispensing the product can be assured that the proper type of coffee has been fed to the proper carafe.

According to a feature of the invention, the microprocessor controller, which in general is capable of performing the functions described in my above identified copending application and my earlier U.S. Pat. No. 4,858,523, responds to sensing means at the respective stations of the machine to signal the microprocessor controller as to the type of carafe which is present at a particular station. These sensors also serve to indicate to the microprocessor controller when a station is empty, i.e. does not have a carafe located thereat, thereby avoiding the dispensing of the beverage at a location from which a carafe has been removed.

I have found it to be advantageous to provide a motorized distributor which selectively receives the coffee grounds from one or another hopper or bin containing ground decaffeinated and ground normal coffee respectively, and delivering a measured quantity of the grounds to the brewing chamber.

Of course, if desired, a common coffee grinder can be provided between the motorized scooper or coffee metering device so that coffee beans of one or the other type can be drawn from the respective bin, delivered to the grinder and fed in the form of grounds to the brewing compartment.

According to a further feature of the invention, the machine not only has a plurality of stations for the respective carafes, but also a tank into which a larger quantity of coffee can be introduced so that the service employee need only draw upon this quantity for cup filling or for the filling of carafes if a higher rate of dispensing is desired.

According to another feature of the invention, the machine can be equipped with a device for filling individual cups of coffee, e.g. for takeout service. This device can be provided with a plunger which lowers a sealing head into the mouth of the cup and through which the cup can be fed with the brewed beverage selected with the microprocessor in the manner described or dispensed from a tank of the type also described previously. Advantageously, sensor means provides an input to the microprocessor can which respond to the cup which is positioned at the cup-filling station and communicating with the microprocessor to dispense the volume required to fill that cup. The apparatus can be used, for example, to selectively fill 4, 6 or 8 ounce cups as the need dictates.

BRIEF DESCRIPTION OF THE DRAWING

The above and other objects, features and advantages of my invention will become more readily apparent from the following description, reference being made to the accompanying highly diagrammatic drawing in which:

FIG. 3 is an elevational view illustrating a cup filling unit which can be provided on the machine of FIG. 1, e.g. on the side thereof opposite the tank or at the same side as the tank;

SPECIFIC DESCRIPTION

Figure 1:
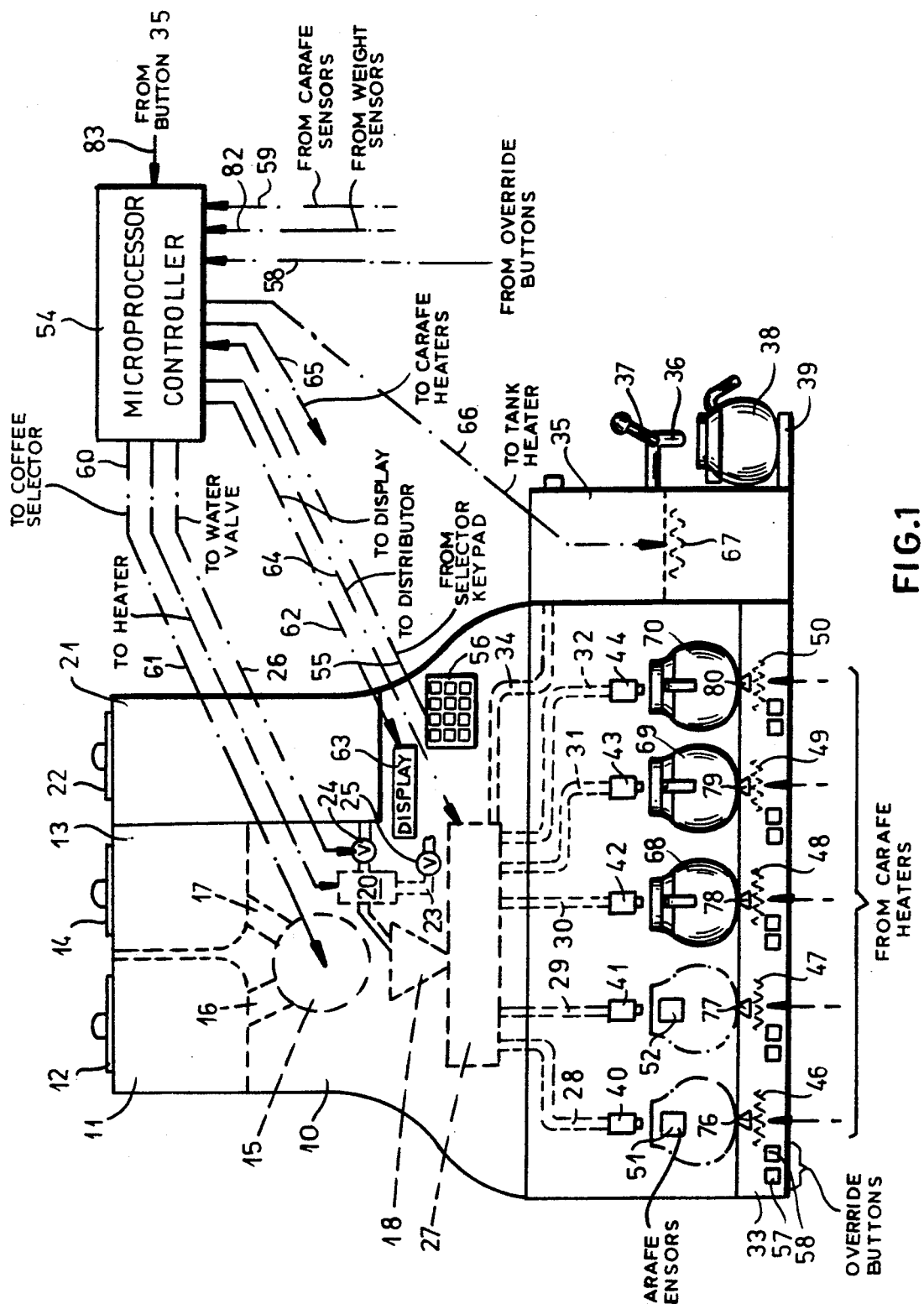
FIG. 1 is an elevational view of a coffee making machine illustrated in highly diagrammatic form, with the control system which is built into the machine being illustrated in block diagram from outside the machine housing.

In FIG. 1 of the drawing, I have shown a coffee making machine which comprises a housing 10 and, within that housing, 10 and, within that housing, a bin 11 which can be filled with ground decaffeinated coffee beans upon removal of a cover 12, and a bin 13 which can be filled with ground normal (nondecaffeinated) coffee through a cover 14. In place of the ground coffee in these bins, the bins may be used to dispense coffee beans and in that case a coffee grinder can be interposed between the metering device and the brewing chamber or compartment as has been mentioned previously.

A metering device which can be a motorized drum 15 is provided between the spouts 16 and 17 of the bins, and the brewing compartment 18 which is a conical housing holding a permanent coffee filter. If desired, the coffee filter may be replaceable through an opening provided in an end wall of the housing 10. The motorized distributor 15 may also be a scooper which can selectively dip into quantities of the respective grounds or beans as desired. Upon rotation of the device 15, an opening of the latter can be selectively communicated with one of the spouts 16 and 17 and then, after a metered quantity of coffee has been transferred to the device 15, can be rotated to dump this coffee into the brewing compartment 18.

Also communicating with the brewing compartment 18 and in an illustrated diagrammatically, for a water feed pipe 19 which extends from an electric heater 20 of the instantaneous heating type.

The water fed to the heater 20 can derive from a reservoir 2 which can be filled upon removal of a lid 22, or from a water supply pipe 23 connected to the water mains or waterline of the restaurant or other institution.

A valve 24 or 25 provided with a valve control line 26 is provided to regulate the flow of water to the brewing compartment 18 in accordance with the quantity of coffee which has been placed in this compartment and the amount of coffee which is to be brewed.

The brewed coffee, in turn, is fed to a distributor 27 which may be of the type described in my aforementioned copending application Ser. No. 07/389,424 (U.S. Pat. No. 4,967,648) which is incorporated herein in its entirety by reference.

From that distributor, a plurality of outlet lines 28, 29, 30, and 32 can extend to a multiplicity of carafe stations on a platform 33 of the housing 10.

A further coffee outlet line 34 delivers coffee to a tank 35 having an outlet spigot 36 controlled by a lever 37 for manually dispensing coffee, e.g. into a carafe 38 on a support 39 adjacent the tank.

Figure 2:
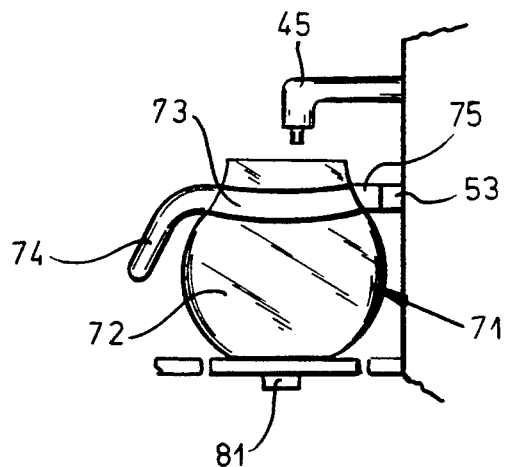

Each of the carafe stations has an outlet spigot 40, 41, 42, and 44, one of which has been illustrated in side view at 45 in FIG. 2. In addition, each station has a heater 46, 47, 48, 49, and a carafe sensor of which only two have been illustrated at and 52 in FIG. 1 and at 53 in FIG. 2. The function of the carafe sensor will be developed below.

In addition, the apparatus comprises a microprocessor controller 54 which may also be of the type described in my abovementioned copending application Ser. No. 07/389,424 (U.S. Pat. No. 4,967,648) and can perform all of the functions described therein as well as those detailed below. As in that application the microprocessor has a number of inputs. For example, to program the unit and for product and quantity selection purposes, an input 55 can be provided from a selector key pad 56. Any other push button array or selector button array may be used if desired. Inputs also derive from override buttons 57 and 58 at each carafe station to enable the operator to override the computer control and manually select normal coffee or decaffeinated coffee for the particular station. The inputs from the override buttons have been represented diagrammatically at 58. The carafe sensors 51 to 53, etc. supply inputs to the microprocessor controller as represented at 59.

As is also clear from the abovementioned copending application, the microprocessor controller will have a multiplicity of outputs. These outputs can include a controller line 60 for the coffee scooper or metering device 15, a control output 61 to the heater 20, the line 26 running to the water valves 24 or 25, an output 62 to a display 63 which can be of the liquid crystal type and can display both the status of the apparatus and selections as they are made and entered, in output 64 to the distributor 27, an output 65 to the carafe heaters 46 to 50 and an output 66 to a heater 67 for the tank 35. Carafes 68, 69 and 70 are shown to be in place on respective stations and the stations of the sensors 51 and 52 are shown to have no carafes positioned thereon, the carafes having been removed, for example, by service personnel to fill the coffee cups of consumers.

As can be seen from FIG. 2 each carafe, such as the carafe 71 illustrated in this FIG., can comprise a transparent glass vessel 72 formed with a band 73 on which a handle 74 is mounted. The color of the band 73 can indicate the type of coffee which it is intended to dispense therefrom. For example, this band may be orange for dispensing decaffeinated coffee or brown or black for dispensing normal coffee. The band carries a coded element 75, for example, a magnetized plate with a magnetized pattern which can be read by the sensor 53. It will be understood, however, that any other type of coding can be used as well. For example, member 75 may be provided with a plurality of electrical contacts which can cooperate with contacts in member 53 to signal to the microprocessor the particular type of carafe which is positioned at the station associated with that sensor. Alternatively, an optical sensor may be used and can respond to the color of member 75. In still another alternative, member 75 may be provided with a bar code to which a bar code reader head may respond, each of the sensors 53 then forming a bar code reader head. The sensor can respond to one item of information, namely, the type of coffee required for the particular carafe, or to substantially more information, for example, both the type of coffee and the quantity which can be held by the particular carafe if carafes of different volumes ar used in the system.

As each empty carafe is placed upon its station, the fact that it is empty can be detected by respective weight sensors shown only diagrammatically at 76, 77, 78, 79, 80 and 81 in FIGS. 1 and 2, and a signal provided to the controller 54 via the line 82 to signal the controller to begin a carafe filling sequence. Since the carafe sensor 51 to 53 has simultaneously determined which type of coffee is to be supplied to the carafe or, via the coding, whether the carafe is only to be filled with hot water for tea, for example, the controller 54 can either activate the device 15 to select the appropriate quantity of the coffee or simply signal the water heater 20 and valve 24 or 25 and the distributor 27 to deliver a metered quantity of hot water to the carafe.

If one of the types of coffee is selected, the coffee grounds are automatically delivered to the brewing chamber 18 which is supplied with the heated water via one of the valves 24 or 25 and the coffee is then delivered to that carafe.

A button on the tank 35 can be depressed to supply an input to the microprocessor controller 54 via the line 83 to similarly cause the microprocessor controller to repeat the coffee brewing process a number of times so that the brewing chamber is fed via one of the valves 24 or 25 and the coffee is then delivered by the distributor 27 to the tank 35 to refill the latter.

Of course, an override button 57 or 58 may be pushed for any of the carafe stations to override the instruction generated by the microprocessor and, for example, switch between caffeine containing coffee and decaffeinated coffee should the need arise.

While the apparatus as described operates with coded carafes to automatically input information as to the coffee desired for the carafe to the microprocessor, it will be understood that it is possible to provide separate stations for normal coffee and decaffeinated coffee, for example, and to so define those stations that only the appropriate carafe will fit each station.

Figure 3:
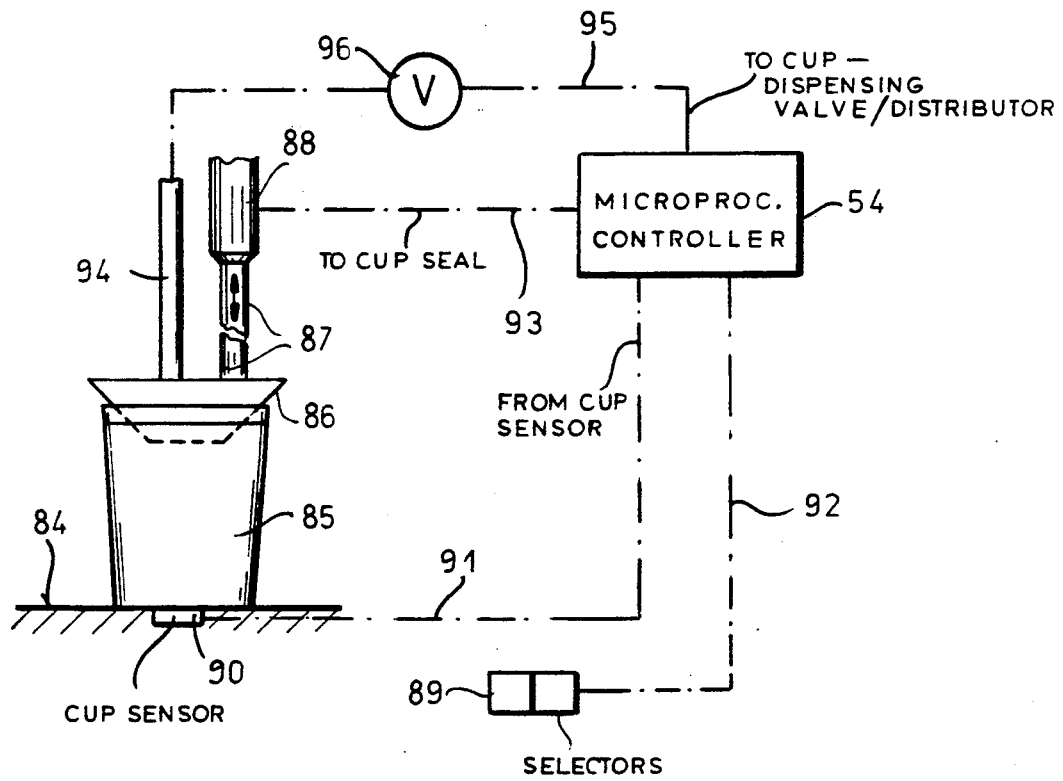
FIG. 3 is an elevational view showing the interaction between a carafe and a carafe sensor according to the invention.

In FIG. 3 I have shown an additional station for the machine of FIG. 1 which is not visible in this FIG. because it may be behind the tank 35 shown therein or can be substituted for the tank 35. This station has a platform 84 on which a takeout-type coffee cup 85 can be placed. Above this station a sealing head 86 is displaceable vertically by a plunger 87 having a drive 88 which can be hydraulic, pneumatic or electrical so that the head 86 can be automatically lowered when a cup 85 is placed on the plate from 84 and automatically raised upon completion of a coffee dispensing operation.

The cup-sealing arrangement 86 to 88 is operated by the microprocessor 54.

The inputs to the microprocessor for this purpose can derive from a selector switch 89 disposed at the cup filling station and from a cup sensor 90, e.g. a weight sensor.

When a cup 85 is placed on the sensor 90, a signal is transmitted via the line 91 to the microprocessor, indicating the size of the cup. When one of the selector buttons 89 is actuated to select decaf coffee, normal coffee or hot water for tea, the appropriate signal via line 92 to the microprocessor results in the delivery of a signal via line 93 to the cup seal unit 86 to 88 to lower the sealing head 86 to close the mouth of the cup except for a small vent passage (not shown).

The filling of the cup with coffee or water is effected via line 94 by an input through line 95 to a dispensing valve 96 and the distributor so that an appropriate quantity of the selected beverage will be delivered to the cup.

When delivery is completed, the head 86 automatically raises and the lid can be placed upon the cup and the cup delivered to the patron.

The machine 100 shown in FIG. 4 can be operated in the same manner as the machine described in connection with FIGS. 1 through 3 and differs only in the layout of the various elements visible from the exterior of the machine. The machine 100 has a base 101 on which the stations 102, 103, 104, for example, can be provided. These stations can be used interchangeably to receive a cup 105, a carafe 106 and a portable tank 107 from which the coffee can be dispensed via a spigot 108. Appropriate sensors like those at the stations described in the embodiment of FIGS. 1 through 3 can detect corresponding signalling devices or can respond to the weight of the cup, a carafe or a portable tank so as to signal the microprocessor as to the type of container which is positioned at the respective station. The coffee or other infusion beverage is delivered to the respective container in a quantity determined by the volume of that container.

To that extent, therefore, the stations 102-104 are interchangeable and all can receive carafes as described for the multicarafe arrangement of FIG. 1.

Figure 4:
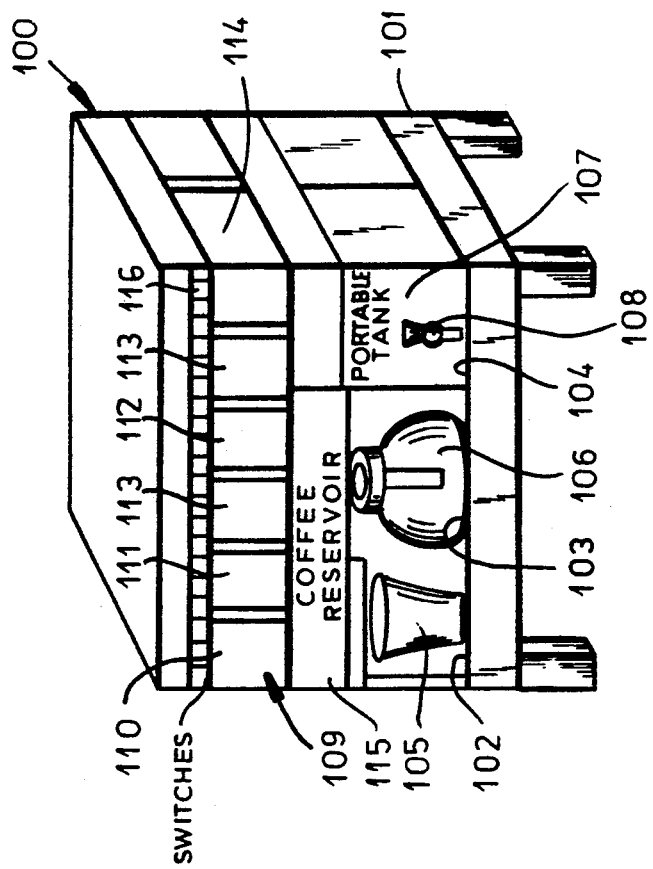
FIG. 4 is a diagrammatic perspective view of another machine configuration which can be employed according to the invention.

Another difference between the embodiment of FIG. 4 and the embodiment of FIG. 1 is the organization of the bins which are shown to lie in a row 109. These bins can include a bin for tea 110, bins for coffee 111 and 112, bin for decaffeinated coffee at 113 and 114 and at least one other bin as represented at 114 for receiving some other product which can be combined with hot water to form an infusion beverage.

The operation of the distributor for distributing the respective beverages to the selected stations and the means for selecting among the bins for preparation of the beverages has been described in connection with FIG. 1 and can be identical thereto here.

The permanent coffee tank or reservoir can here be provided as a horizontally extending reservoir 115 and can have its dispenser at a side of the machine not shown. The switches for controlling the microprocessor and selecting the product or a particular programs can be provided in a row at 116 in the embodiment of FIG. 4.

Figure 5:
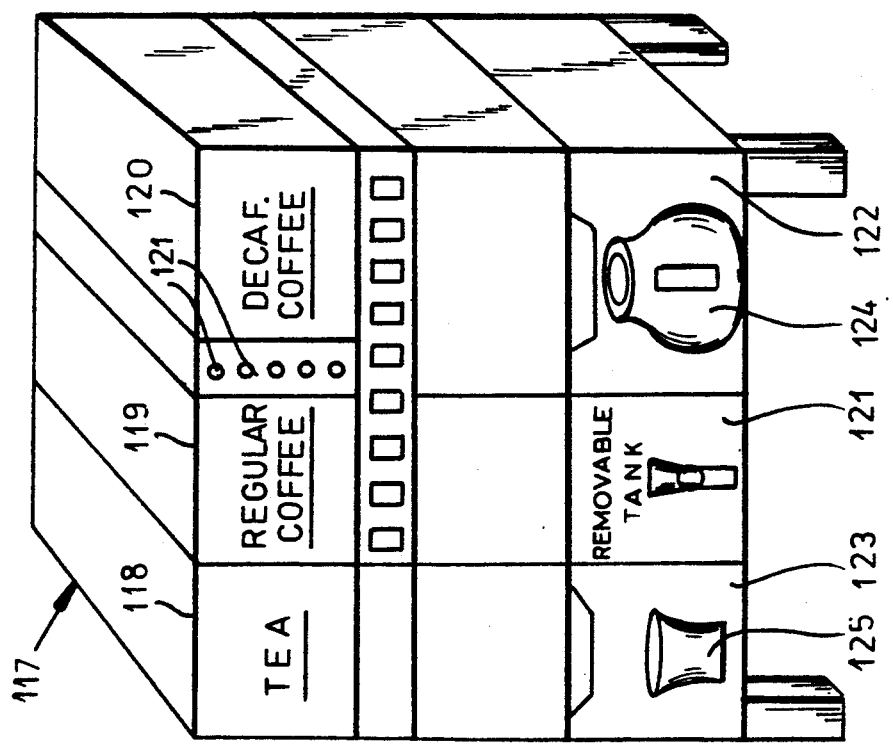
FIG. 5 is a view similar to FIG. 4 showing yet another machine configuration.

The embodiment of FIG. 5 utilizes principles similar to that of FIG. 4. The coffee machine 117 of this embodiment comprises respective bins 228, 119 and 120 for tea, regular coffee and decaffeinated coffee, respectively and pilot lights 121 can be provided to signal the status of the machine and the product which is being brewed. The removable tank 121 is here shown to be located between stations 122 and 123 which can dispense the beverage into a carafe 124 or a cup 125, respectively.

I claim:

1. A coffee making machine comprising:
    a housing;
    a brewing chamber on said housing adapted to receive coffee grounds and brew a coffee beverage therein;
    a plurality of stations on said housing adapted to receive respective dispensing carafes;
    a distributor between said brewing chamber and said stations for delivering respective quantities of coffee brewed in said brewing chamber to said station; and
    control means on said housing for selectively delivering one of a plurality of types of coffee to said brewing chamber.

2. The coffee making machine defined in claim 1, further comprising means at at least one of said stations operatively connected with said controller means for signalling to said control means a particular type of coffee desired for a carafe at said one of said stations.

3. The coffee making machine defined in claim 2 wherein each of said carafes is coded to automatically signal by coding of the carafe to said controller a type of coffee desired for each carafe at each of said stations.

4. The coffee making machine defined in claim 3, further comprising a tank on said housing dimensioned to receive a volume of coffee in excess of that of one of said carafes and provided with means for manually dispensing coffee from said tank.

5. The coffee making machine defined in claim 3 wherein said controller includes a microprocessor.

6. The coffee making machine defined in claim 3 further comprising a plurality of bins formed in said housing and receiving ground decaffeinated coffee and ground normal coffee respectively, and a metering device selectively communicating with said bins for feeding a respective coffee to said brewing chamber.

7. The coffee making machine defined in claim 3, further comprising means at said stations for automatically signalling to said controller the presence of a carafe requiring filling at the respective stations.

8. The coffee making machine defined in claim 3, further comprising override means enabling an operator to override automatic response of said controller.

9. The coffee making machine defined in claim 3, further comprising means for dispensing cup quantities of a beverage automatically.

10. The coffee making machine defined in claim 9 wherein said means for dispensing includes;
    a platform adapted to receive a cup to be filled;
    a seal insertable into a mouth of said cup;
    a plunger connected to said seal for vertically displacing same and inserting said seal into the mouth of said cup;
    means for delivering brewed beverages through said seal to said cup; and
    sensor means respective to positioning of a cup on said platform for automatically signalling said controller to enable said distributor to deliver coffee to said cup.

11. The coffee making machine defined in claim 9 wherein said means for dispensing includes a platform adapted to receive a cup to be filled;
    a seal insertable into a mouth of said cup;

a plunger connected to said seal for vertically displacing same and inserting said seal into the mouth of said cup;

means for delivering brewed beverages through said seal to said cup; and sensor means responsive to positioning of a cup on said platform for automatically signalling said controller to enable said distributor to deliver coffee to said cup.

12. A coffee making machine comprising:

a housing;

brewing means in said housing for selectively brewing at least two different coffee beverages and dispensing same;

means forming at least one dispensing station on said housing;

a plurality of coffee receptacles adapted to be disposed at said station for receiving a coffee beverage brewed by said brewing means; and selector means on said receptacles and said housing cooperating upon positioning of one of said receptacles at said station for automatically selecting a particular beverage for dispensing into the receptacle positioned at said station whereby each of said plurality of receptacles receives a respective coffee beverage.

* * * * *